US008448520B1

(12) United States Patent
Baroudi et al.

(10) Patent No.: US 8,448,520 B1
(45) Date of Patent: May 28, 2013

(54) BOLT TENSION MONITORING SYSTEM

(75) Inventors: Uthman Baroudi, Dhahran (SA); Samir Mekid, Dhahran (SA); Abdelhafid Bouhraoua, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 13/312,860

(22) Filed: Dec. 6, 2011

(51) Int. Cl.
*F16B 31/02* (2006.01)

(52) U.S. Cl.
USPC .......................................................... 73/761

(58) Field of Classification Search
USPC .......................................................... 73/761
See application file for complete search history.

(56) References Cited

U.S. PATENT DOCUMENTS

| | | | |
|---|---|---|---|
| 6,791,465 B2 * | 9/2004 | Blagin et al. ................... | 340/665 |
| 7,268,517 B2 | 9/2007 | Rahmel et al. | |
| 7,278,341 B1 | 10/2007 | Novin et al. | |
| 7,400,247 B2 | 7/2008 | Hopman et al. | |
| 7,412,898 B1 | 8/2008 | Smith et al. | |
| 8,024,980 B2 * | 9/2011 | Arms et al. ................... | 73/763 |
| 2006/0022056 A1 | 2/2006 | Sakama et al. | |
| 2006/0123917 A1 | 6/2006 | Kibblewhite | |
| 2009/0112925 A1 | 4/2009 | Amirehteshami et al. | |
| 2009/0303076 A1 | 12/2009 | Setiadi et al. | |
| 2010/0050778 A1 | 3/2010 | Herley et al. | |

FOREIGN PATENT DOCUMENTS

WO  WO 2010028308 A1  3/2010

* cited by examiner

*Primary Examiner* — Lisa Caputo
*Assistant Examiner* — Octavia Davis-Hollington
(74) *Attorney, Agent, or Firm* — Richard C. Litman

(57) ABSTRACT

The bolt tension monitoring system provides remote monitoring of the tension of a bolt, thus allowing for remote monitoring of general structural health and integrity of the fastener. The bolt tension monitoring system includes a housing adapted for being retained on a head of a bolt to be monitored. The system further includes a force transducer positioned between the head of the bolt and a workpiece surface in which the bolt is fastened and measures tension between the head of the bolt and the surface. A controller circuit disposed within the housing calculates a difference between a currently measured tension between the head of the bolt and the workpiece surface and an initially measured tension. A wireless transponder mounted in the housing transmits an alert signal if the calculated difference exceeds a pre-defined threshold value. Actuation and power are provided through radio frequency power harvesting.

20 Claims, 4 Drawing Sheets

BOLT TENSION MONITORING SYSTEM

BACKGROUND OF THE INVENTION

1. Field of the Invention

The present invention relates to mechanical fasteners and to electronic sensors for detecting failure of mechanical components, and particularly to a bolt tension monitoring system for transmitting signals identifying measured tension, power for and actuation of the system being provided through radio frequency power harvesting.

2. Description of the Related Art

Bolted joints are found in a wide range of structures and machines, and improperly tightened bolts, or loosened bolts, may severely compromise the safety and structural integrity of a joint. Insufficient pre-loading tension is a common cause of bolted joint failure. Similarly, due to the stresses a structure or machine undergoes in its lifetime, bolts can easily become loosened over time. Insufficient tension in the bolt, even if it was properly tightened at the time of construction, can also cause joint failure.

Given that most structures and machines use hundreds or thousands of bolts in their construction, it is impractical to regularly manually test the tension of each bolt. Bolts are often hidden from view or are otherwise inaccessible once a structure or machine is fully constructed. Thus, it would be desirable to provide a remote monitoring system that could measure the tension in a bolt, throughout its lifetime, and also provide accurate identification and location information for that bolt if a loss of tension is detected.

Thus, a bolt tension monitoring system solving the aforementioned problems is desired.

SUMMARY OF THE INVENTION

The bolt tension monitoring system provides remote monitoring of the tension of a bolt, thus allowing for remote monitoring of general structural health and integrity. The bolt tension monitoring system includes a cap or housing having opposed upper and lower ends, the lower end defining a recess adapted for being retained on a head of a bolt to be monitored. The system further includes a force transducer having opposed upper and lower faces, the head of the bolt bearing on the upper face of the force transducer when the bolt is fastened to a workpiece. The force transducer is positioned between the head of the bolt and a surface in which the bolt is embedded and measures tension between the head of the bolt and the workpiece surface.

A controller circuit disposed in the housing calculates the difference between a currently measured tension between the head of the bolt and the workpiece surface and an initially measured tension. A wireless transponder mounted in the housing transmits an alert signal if the calculated difference exceeds a pre-defined threshold value. A radio frequency identification tag is also mounted in the housing, and is in communication with the wireless transponder. The radio frequency identification tag has identification information associated with the bolt stored therein, and the alert signal includes the identification information.

Actuation and power are provided through radio frequency power harvesting. Upon receiving an actuating signal within a specific frequency range, power is provided to the system through power harvesting, and the signal also serves to "wake up" or actuate the system. The system may send the alert signal, as described above, if the tension is found to be outside of the desired range, or, alternatively, a signal containing the measured tension can be transmitted at the time of actuation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
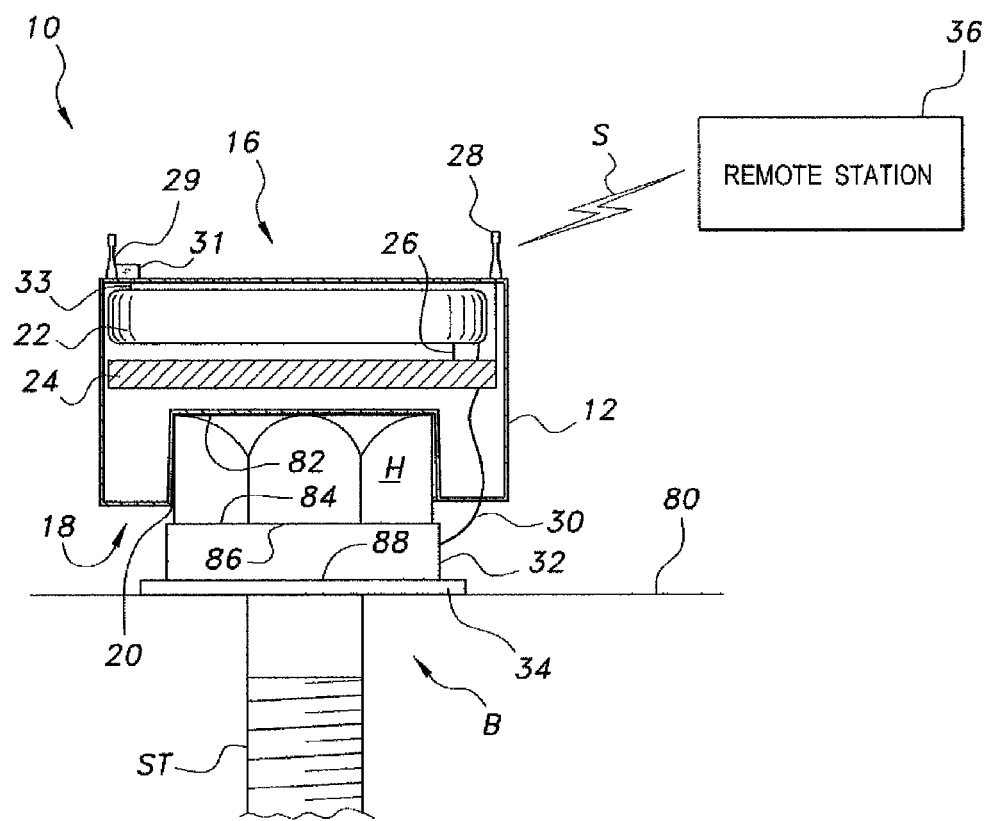
FIG. 1 is an environmental, side view of a bolt tension monitoring system according to the present invention, the housing or cap and the printed circuit board housed therein being shown in section.

The bolt tension monitoring system 10 provides remote monitoring of the tension of a bolt B, thus allowing for remote monitoring of general structural health and integrity of the fastener. The bolt tension monitoring system 10 includes a hollow cap or housing 12 having opposed upper and lower ends 16, 18, respectively, the lower end 18 defining a recess 20 adapted for receiving the outer face 82 of a head H of a bolt B to be monitored. Preferably, the head H of the bolt B is snugly received within the recess 20. It should be understood that the housing 12 may be dimensioned and configured to form a snap fit or pressure fit with the size and shape of the particular type of bolt B to which the housing 12 is applied.

The system 10 further includes a force transducer 32 having opposed upper and lower faces 86, 88, respectively, the head H of the bolt B having an inner or lower face bearing against the transducer 32 when the bolt B is fastened to a workpiece. The force transducer 32 is positioned between the head H of bolt B and a workpiece surface 80 in which the bolt B is fastened and measures tension between the head H and the workpiece surface 80. The force transducer 32 is preferably annular, having a central aperture or opening thereof receiving the shaft ST of the bolt B. A washer 34 may be provided, the lower face 88 of the force transducer 32 contacting the washer 34, which is positioned between the lower face 88 and the workpiece surface 80. The shaft ST of the bolt B passes through the central opening of the washer 34.

In operation, the system 10 is ordinarily in a sleep, or low power, mode. Upon receiving a polling or activation signal from a remote station 36, the system 10 actuates. Upon actuation, depending upon the particular programming of system 10, either a direct measurement of tension is made by the transducer 32, and this tension measurement is transmitted to the remote station 36, or alternatively, a controller circuit 24 mounted on a printed circuit board (PCB) in the housing 12 calculates the difference between a currently measured tension between the head H of bolt B and the workpiece surface 80 and an initially measured tension. A transmission is only made if the currently measured tension is outside of a preferred range or threshold, as will be described in detail below.

The controller circuit 24 may include any suitable type of controller, such as a microprocessor, a programmable logic controller, or the like. A wireless transponder 40 mounted in the housing 12 transmits an alert signal S if the calculated difference exceeds a pre-defined threshold value. A first antenna 28 is preferably mounted on the housing 12 and is in communication with the controller circuit 24 and the transponder circuit 40 via a wired connection.

It should be understood that the wireless transponder circuit 40 may comprise any suitable type of wireless transponder, and may be provided as a separate component or integrated into the controller circuit 24. The wireless transponder 40 may be a ZigBee® transponder, for example. A radio frequency identification tag (RFID) 50 is also mounted in the housing 12 and is in communication with the wireless transponder 40. The radio frequency identification tag 50 has identification information associated with the bolt stored therein, so that the alert signal S may include the identification information from the RFID tag 50.

The initially measured tension when the bolt B is first installed may be stored in memory 90, which may be any suitable type of computer readable storage medium, or a desired initial tension may be recorded in the RFID tag 50. The RFID tag 50 preferably includes a particular identifier associated with a particular bolt, location information for the bolt (included in the transmitted identification information) and, as noted above, may also include the desired initial tension. A battery 22 is preferably provided within housing 12 for powering the controller circuit 24, the transponder circuit 40, and the other system components, the battery 22 being connected to the PCB and the circuits mounted thereon by a spacer containing internal wiring. It should be understood that any suitable type of power source may be utilized. Preferably, power harvesting from transmitted signal S, from remote station 36, may be used in combination with, or to replace, the battery 22.

The actuation signal from the remote station 36 not only "wakes up" or actuates the system 10, but the particular radio frequency used is collected by a second antenna 29, processed through an RF power module 31 to generate usable electricity, and is in communication with battery 22 via line 33. RF power harvesting, similar to solar power, is known in the art. One such system is shown in U.S. patent publication no. US 2009/0303076 A1, which is herein incorporated by reference in its entirety. It should be understood that any suitable type of RF or electromagnetic power harvesting or conversion system, or rectifier, may be utilized. As an alternative, the second antenna 29 may be removed, and the first antenna 28 may be used for both communication and power harvesting from the transmitted RF signal.

As shown in FIG. 1, the force transducer 32 communicates with the controller circuit 24 via wired connection 30. The transducer 32 may be any suitable type of force, tension or torque transducer. The transducer 32 is preferably a relatively low-voltage transducer with calibrated readings on the order of a few Volts. Such transducers are well known in the art and commercially available, and need not be described further herein. Torque applied to the bolt B is measured as tension between bolt head H and surface 80. This tension must be maintained at a constant level for structural safety and integrity.

Figure 3:
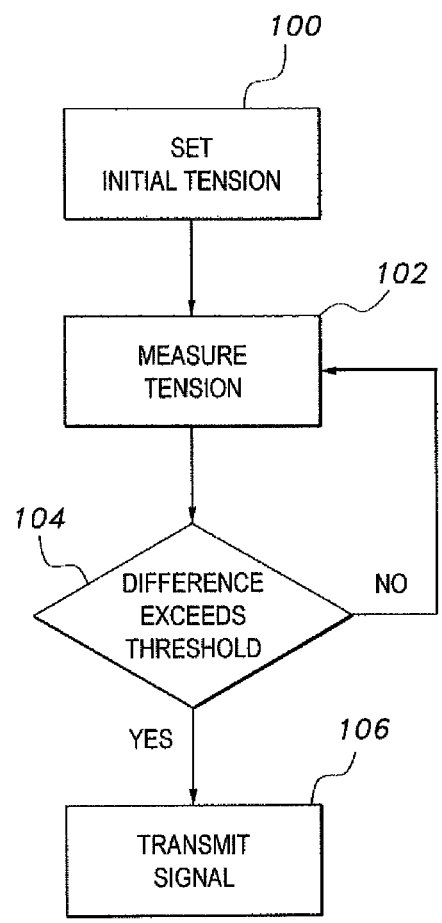
FIG. 3 is a flowchart illustrating operation of the bolt tension monitoring system according to the present invention.

As shown in FIG. 3, the initially measured tension (set at the time of bolt tightening) occurs in step 100 and is recorded in memory 90. Alternatively, RFID tag 50 may have a desired initial tension stored therein. The transducer 32 measures currently applied tension, either continuously or at regular intervals, as indicated in step 102. The controller circuit 24 calculates the difference value between the currently measured tension and the stored initial tension. At step 104, the controller circuit 24 determines if the calculated difference exceeds a pre-defined threshold. If not, then the flow returns to step 102, and the system 10 continues to monitor the tension, either continuously or at regular intervals. If the difference exceeds the pre-defined tension, then the flow proceeds to step 106, at which point the wireless transponder 40 transmits an alert signal S to a remote monitoring station 36. As noted above, the alert signal S includes identification information regarding the particular bolt, including the bolt's location, so that appropriate repair and maintenance can be performed by responding personnel.

Figure 2:
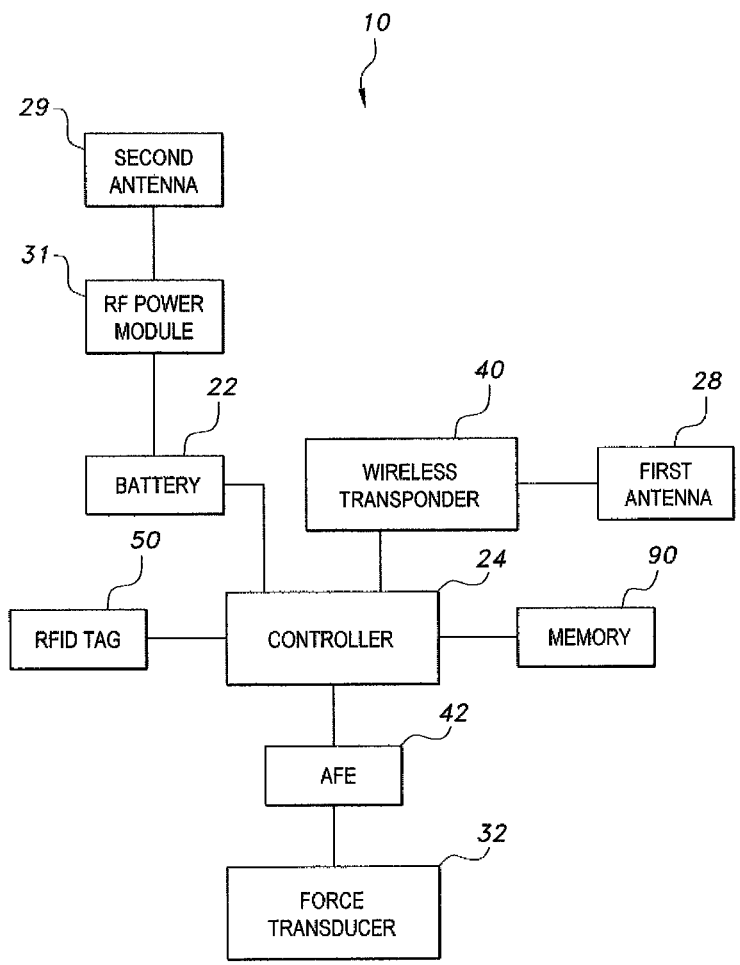
FIG. 2 is a block diagram illustrating system components of the bolt tension monitoring system according to the present invention.

As shown in FIG. 2, an analog front-end (AFE) circuit 42 is also preferably provided for conditioning the signal generated by the force transducer 32 prior to measurement and analysis by the controller circuit 24. The AFE circuit 42 may be a stand-alone conditioning circuit, or may be integrated into the controller circuit 24. Additionally, it should be understood that power-saving circuitry or programming may be utilized, allowing the system 10 to enter a power saving or "sleep" mode when not in use. Further, the AFE circuit 42 preferably communicates with at least one analog-to-digital converter for converting analog signals generated by the transducer 32 into digital data for processing by controller 24. The analog-to-digital converter may be integrated into the controller 24 or into the transducer 32.

In addition to measuring force or tension of bolt B, it should be understood that additional types of sensors may be integrated into system 10. For example, local temperature and/or humidity sensors may also provide environmental condition information to further be transmitted in signal S. Further, the controller circuit 24 may be programmed to monitor tension continuously or at pre-set intervals, or the wireless transponder 40 may be used to receive an actuation signal from the remote station 36, with monitoring occurring only when an actuation signal is received by the wireless transponder 40.

It should be understood that the system 10 may be used to communicate with other neighboring bolts equipped with similar systems, each individual system 10 forming a single node in a monitoring network. Each system in the network can send out a polling signal, including location/identification information, and a power reading from the on-board battery 22. A cluster head may be elected based upon the residual power measurements and centralized location.

Figure 4:
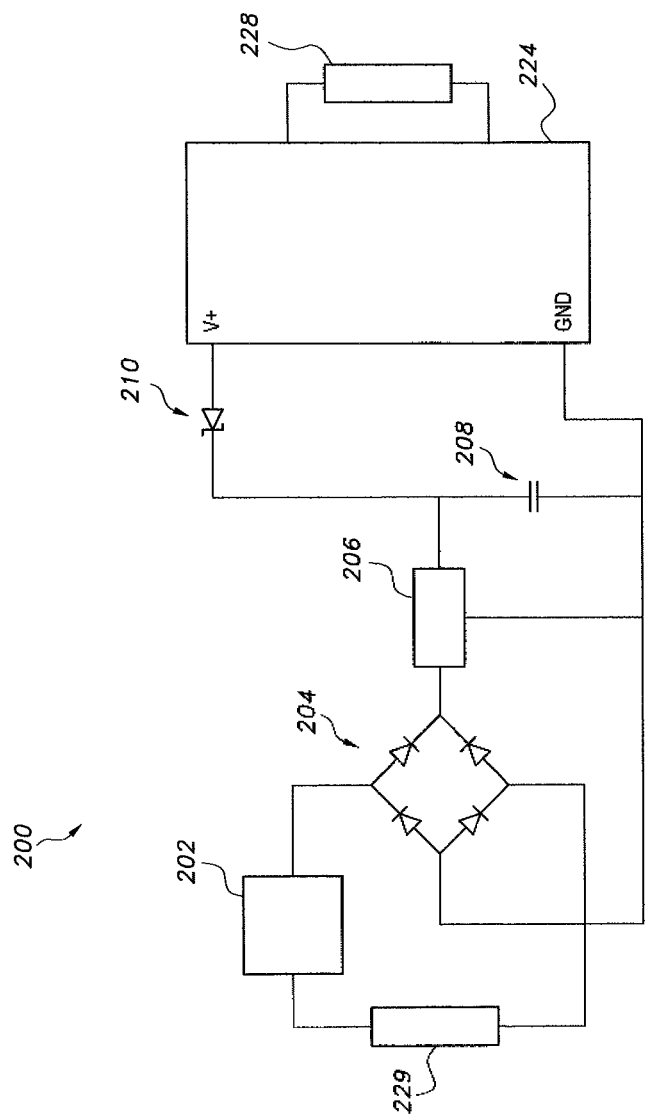
FIG. 4 is a schematic drawing of a controller circuit for an alternative embodiment of the bolt tension monitoring system.

In the embodiment illustrated in FIG. 4, the controller circuit 200 includes a microcontroller 224, similar to controller circuit 24, a first antenna 228, similar to first antenna 28, and a second antenna 229, similar to antenna 29. The second antenna 229 is in communication with a matching circuit 202, which is an LC circuit tuned to a specific frequency range, such as the 900 MHz range, which is frequently used for RFID signals. The output of the matching circuit 202 is fed to a rectifying bridge of diodes 204 (in this case, a full wave bridge rectifier, which rectifies the signal from a sinusoidal AC signal to an almost continuous DC voltage. This DC voltage is fed to a voltage regulator 206, which charges a capacitor 208. The capacitor 208 is connected to the power pin (indicated as V+ in FIG. 4) of microcontroller 224 through a Zener diode 210.

As in the previous embodiment, the microcontroller 224 either has its own RF transceiver module built in, or is in communication with a separate RF transceiver module. Preferably, the RF transceiver operates at a higher frequency than the frequency range of second antenna 229 for transmitting signals through first antenna 228 to the remote station. The range of the first antenna 228 may be, for example, in the 2.4 GHz range. The separate frequency ranges are used to avoid interference.

When the remote station transmits the lower frequency, which is received by second antenna 229, the controller 224 is "woken up" or actuated. This occurs via the above process, so that power is fed into the power pin of microcontroller 224 from capacitor 208. Once actuated, the microcontroller 224 performs the tasks described above, such as taking measurements, analyzing the measurements, and transmitting signal S, if necessary.

In a networked scenario, if several such systems 200 are woken up simultaneously, each will eventually attempt to communicate with the remote station, which will result in communication collisions and increases in the number of communication attempts. The uptime required in such a case becomes higher than expected, which requires more power. In order to avoid such a problem, the microcontroller 224 may continuously switch between on "on" state and an "off" state in order to save power and allow the energy harvesting module to charge the capacitor 206.

The controller 224 will then operate in a very limited time period, performing a very simple task and then saving its context to non-volatile memory (such as memory 90 or RFID tag 50 of the previous embodiment), preparing for the next uptime. The controller 224 will then switch to sleep mode, waiting for the power to go off. The uptime is computed according to the amount of power that is saved in the capacitor 208. The Zener diode 210 functions to make sure that the supply voltage is not delivered (through the Zener diode 210) to the microcontroller 224 until the voltage level at the capacitor 208 is above the Zener diode's threshold.

It is to be understood that the present invention is not limited to the embodiments described above, but encompasses any and all embodiments within the scope of the following claims.

We claim:

1. A bolt tension monitoring system, comprising:
    a hollow housing having opposed upper and lower ends, the lower end defining a recess adapted for being retained on a head of a bolt;
    a force transducer having opposed upper and lower faces, the upper face being adapted for providing a bearing surface for the head of the bolt, the force transducer being positioned between the head of the bolt and a workpiece surface in which the bolt is fastened, the force transducer converting tension between the head of the bolt and the workpiece surface into a calibrated voltage;
    a controller circuit electrically connected to the force transducer for calculating a difference between the calibrated voltage corresponding to currently measured tension between the head of the bolt and the workpiece surface and the calibrated voltage corresponding to an initial tension measured when the bolt is installed in the workpiece;
    a transponder circuit for transmitting an alert signal when the difference exceeds a pre-defined threshold value, the transponder circuit being electrically connected to the controller circuit and mounted in the housing; and
    a power harvesting circuit connected to the controller and transponder circuits for harvesting power from radio frequency electromagnetic waves, the power harvesting circuit being disposed in the housing.

2. The bolt tension monitoring system as recited in claim 1, wherein said force transducer is annular, having a central opening formed therethrough adapted for inserting a shaft of the bolt through the opening.

3. The bolt tension monitoring system as recited in claim 2, further comprising a washer positioned between the lower face of said force transducer and the workpiece surface.

4. The bolt tension monitoring system as recited in claim 1, further comprising a battery disposed in the housing, the battery being connected to the controller circuit and the transponder circuit.

5. The bolt tension monitoring system as recited in claim 1, wherein said transponder circuit comprises a wireless transponder.

6. The bolt tension monitoring system as recited in claim 5, wherein said transponder circuit further comprises a first antenna mounted on said housing.

7. The bolt tension monitoring system as recited in claim 6, further comprising a radio frequency identification tag connected to the wireless transponder.

8. The bolt tension monitoring system as recited in claim 7, wherein the alert signal includes identification information associated with the bolt, the identification information being stored on the radio frequency identification tag.

9. The bolt tension monitoring system as recited in claim 8, wherein the identification information includes location information.

10. The bolt tension monitoring system as recited in claim 9, wherein said power harvesting circuit further comprises:
    a second antenna disposed on said housing;
    a matching circuit connected to said second antenna, the matching circuit being an LC circuit tuned to a desired radio frequency range different from said first antenna;
    a bridge rectifier connected to the matching circuit for converting the received radio frequency signal to a DC voltage;
    a voltage regulator connected to the bridge rectifier for regulating the DC voltage; and
    a capacitor connected between the voltage regulator and said controller circuit, the capacitor accumulating a charge harvested from the radio frequency signal, said controller circuit being triggered to turn on and calculate the difference between the currently measured tension between the head of the bolt and the workpiece surface and the initially measured tension when the capacitor accumulates sufficient charge.

11. The bolt tension monitoring system as recited in claim 6, wherein said power harvesting circuit comprises:
    a matching circuit connected to said first antenna, the matching circuit being an LC circuit tuned to a desired radio frequency range;
    a bridge rectifier connected to the matching circuit for converting the received radio frequency signal to a DC voltage;
    a voltage regulator connected to the bridge rectifier for regulating the DC voltage; and
    a capacitor connected between the voltage regulator and said controller circuit, the capacitor accumulating a charge harvested from the radio frequency signal, said controller circuit being triggered to turn on and calculate the difference between the currently measured tension between the head of the bolt and the workpiece surface and the initially measured tension when the capacitor accumulates sufficient charge.

12. The bolt tension monitoring system as recited in claim 11, further comprising a zener diode between said capacitor and said controller circuit, the zener diode preventing said controller circuit from being triggered to turn on until the capacitor has accumulated sufficient charge.

13. A bolt tension monitoring system, comprising:
    a hollow housing having opposed upper and lower ends, the lower end thereof defining a recess adapted for receiving an external face of a head of a bolt;

a force transducer having opposed upper and lower faces, the upper face thereof being adapted for contacting an internal face of the head of the bolt, the force transducer being positioned between the head of the bolt and a surface in which the bolt is embedded, wherein the force transducer measures tension between the head of the bolt and the surface;

a controller circuit electrically connected to the force transducer for calculating a difference between the calibrated voltage corresponding to currently measured tension between the head of the bolt and the workpiece surface and the calibrated voltage corresponding to an initial tension measured when the bolt is installed in the workpiece;

a wireless transponder circuit for transmitting an alert signal when the difference exceeds a pre-defined threshold value, the transponder circuit being electrically connected to the controller circuit and mounted in the housing; and a power harvesting circuit connected to the controller for harvesting power from radio frequency electromagnetic waves, the power harvesting circuit being disposed in the housing.

14. The bolt tension monitoring system as recited in claim 13, wherein said force transducer is annular, having a central opening formed therethrough adapted for inserting a shaft of the bolt through the opening.

15. The bolt tension monitoring system as recited in claim 14, further comprising a washer positioned between the lower face of said force transducer and the workpiece surface.

16. The bolt tension monitoring system as recited in claim 13, further comprising a battery connected to the controller circuit and the wireless transponder circuit.

17. The bolt tension monitoring system as recited in claim 13, wherein said wireless transponder circuit comprises:

a wireless transponder; and
a first antenna mounted on said housing.

18. The bolt tension monitoring system as recited in claim 17, further comprising a radio frequency identification tag in communication with the wireless transponder.

19. The bolt tension monitoring system as recited in claim 17, wherein the signal includes identification information associated with the bolt, wherein said identification information includes location information.

20. The bolt tension monitoring system as recited in claim 17, wherein said means for harvesting power from a transmitted radio frequency signal comprises:

a second antenna disposed on said housing;

a matching circuit connected to the second antenna, the matching circuit being an LC circuit tuned to a desired radio frequency range different from said first antenna;

a bridge rectifier connected to the matching circuit for converting the received radio frequency signal to a DC voltage;

a voltage regulator connected to the bridge rectifier for regulating the DC voltage;

a capacitor connected between the voltage regulator and said controller circuit, the capacitor accumulating a charge harvested from the radio frequency signal, said controller circuit being triggered to turn on and calculate the difference between the currently measured tension between the head of the bolt and the workpiece surface and the initially measured tension when the capacitor accumulates sufficient charge; and a zener diode connected between the capacitor and said controller circuit for preventing said controller circuit from being triggered to turn on until the capacitor has accumulated sufficient charge.

* * * * *